C. H. LAND, Jr.
TRAILER.
APPLICATION FILED JUNE 7, 1918.
1,294,488.
Patented Feb. 18, 1919.
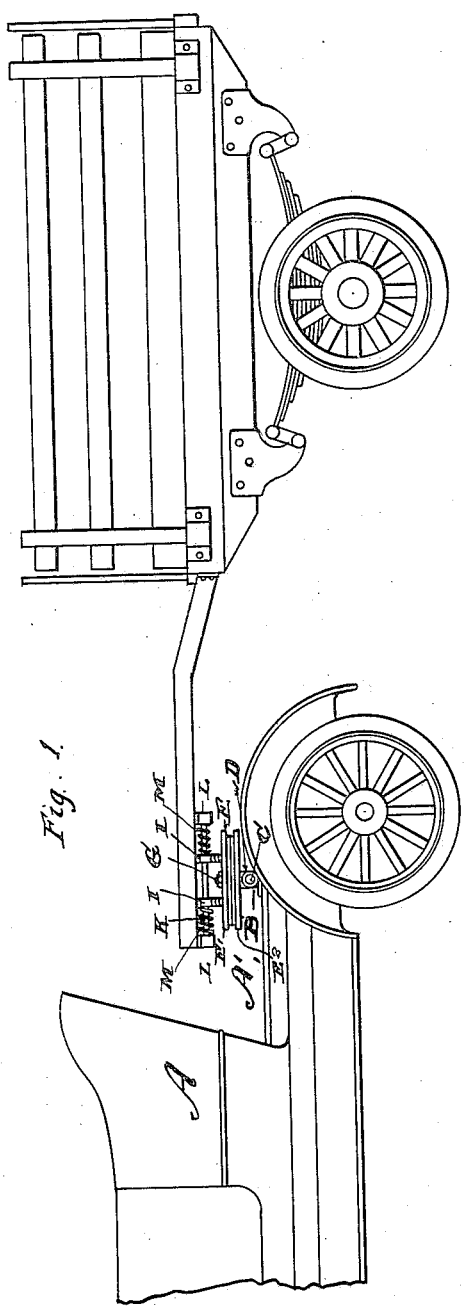
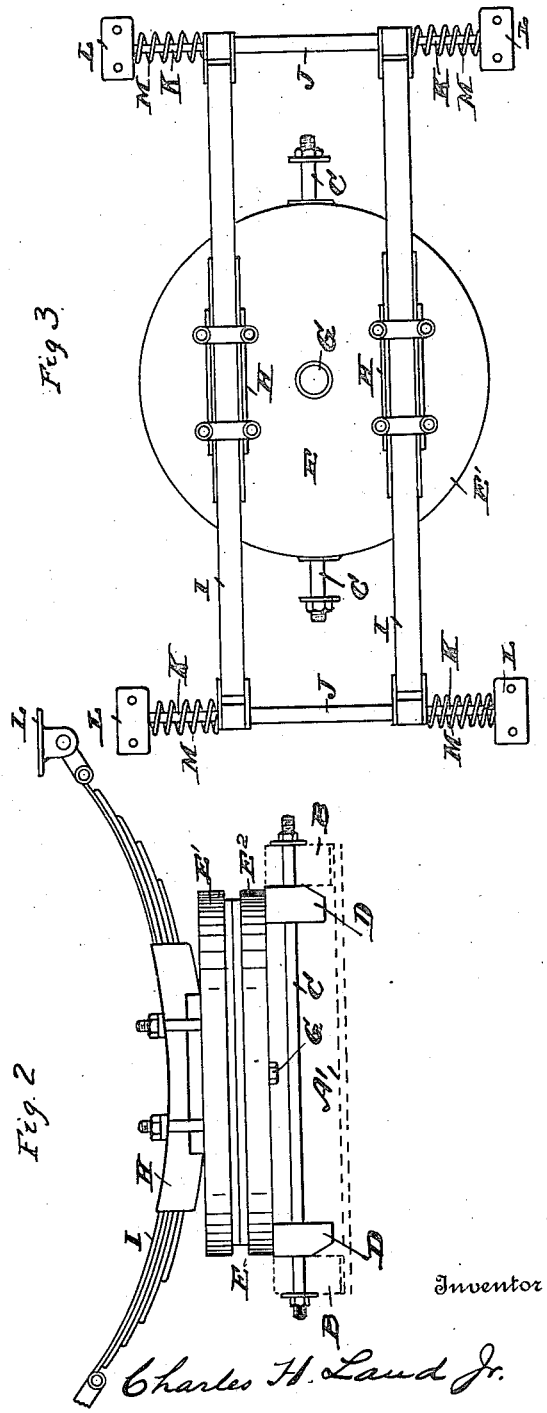

UNITED STATES PATENT OFFICE.

CHARLES H. LAND, JR., OF DETROIT, MICHIGAN, ASSIGNOR OF TWO-THIRDS TO BENJAMIN N. CUTTING, OF DETROIT, MICHIGAN.

TRAILER.

1,294,488.   Specification of Letters Patent.   Patented Feb. 18, 1919.

Application filed June 7, 1918. Serial No. 238,624.

*To all whom it may concern:*

Be it known that I, CHARLES H. LAND, Jr., citizen of the United States, residing at Detroit, county of Wayne, State of Michigan, have invented a certain new and useful Improvement in Trailers, and declare the following to be a full, clear, and exact description of the same, such as will enable others skilled in the art to which it pertains to make and use the same, reference being had to the accompanying drawings, which form a part of this specification.

My invention relates to trailers for motor driven vehicles shown in the accompanying drawings and more particularly described in the following specification and claims.

One of the objects of this invention is an improved fifth wheel connection between a trailer and a motor driven vehicle, whereby a sliding and vertical spring suspension is provided in combination with the fifth wheel, which yieldingly resists the forward and backward movements of the trailer and which readily absorbs irregular vertical movements caused by road conditions.

With the foregoing and other objects in view which will appear as the description proceeds, the invention resides in the combination and arrangement of parts and in the details of construction hereinafter described and claimed, it being understood that changes in the precise embodiment herein disclosed may be made without departing from the spirit of the invention.

In the accompanying drawings forming part of this specification:—

Figure 1 is a side elevation showing the rear end of a motor driven vehicle with a trailer coupled thereto by means of the present invention.

Fig. 2 is an elevation of the device as it would appear from the end of a vehicle on which it was installed, showing in dotted lines the standards for coupling it to a motor driven vehicle.

Fig. 3 is a plan view of the device.

Referring now to the letters of reference placed upon the drawings:—

A, denotes a motor driven vehicle, A', its rear deck or platform on which is bolted a pair of standards B, B, spaced apart to receive a transverse bar or rod C, extending through the hangers D, D, depending from the lower half of a fifth wheel E. E', is the upper half of the fifth wheel connected with the lower portion $E^2$, of the wheel by a king bolt G. The transverse rod C, is provided at its ends with washers and nuts adapted to secure it against disengagement with the hangers and standards. Bolted to suitable bosses or lugs H, H, rising from the upper half of the fifth wheel are two sets of leaf springs I, I, spaced apart and extending transversely across the body of the trailer. The springs I, I, are shackled at their outer ends to suitable connections carried by a pair of sleeves J, J, through which project the rods K, K, supported at each end by brackets L, in turn bolted to the frame of the trailer. Sleeved upon the rods K, between the brackets L, and the leaf spring connection at the ends of the sleeves J, J,—are spiral springs M, which serve to yieldingly resist the forward and backward movements of the trailer with reference to the motor vehicle.

Having indicated the several parts by reference letters the construction and operation of the device will be readily understood.

The leaf springs support the trailer load and serve to absorb the irregular vertical shocks and thus reduce the wear upon the fifth wheel; they also provide a substantial support for the fifth wheel while admitting of quick repairs or the renewal of parts. The transverse connecting rod C, permits the trailer to adjust itself vertically to adapt it to road conditions and the motor vehicle; while the spiral springs M, as previously explained, serve to absorb any forward and backward irregular movements of the trailer.

Having thus described my invention what I claim is:—

1. The combination with a trailer, of a device of the character described comprising a pair of rods spaced apart and arranged parallel with the longitudinal axes of the trailer, means for supporting said rods from the trailer, vertically yieldable springs slidably connected with the rods, a vehicle fifth wheel suspended from the springs, a plurality of spiral springs sleeved upon the rods adapted to yieldingly resist the first named springs, whereby the forward and backward movement of the first named springs upon the rods may be restrained.

2. In a device of the character described, a pair of longitudinally arranged rods spaced apart, means for supporting said rods from a trailer, a pair of leaf springs slidably connected with the rods, a fifth wheel suspended from the leaf springs, sleeves mounted upon the rods between the leaf springs, spiral springs mounted on the ends of rods adapted to yieldingly resist the sliding of the leaf springs, whereby the forward and backward movement of the leaf springs may be yieldingly resisted, and means for pivotally connecting the fifth wheel to a motor vehicle.

In testimony whereof, I sign this specification in the presence of two witnesses.

CHARLES H. LAND, Jr.

Witnesses:
S. E. THOMAS,
JOHN CONSIDINE, Jr.